Patented Nov. 9, 1943

2,333,956

UNITED STATES PATENT OFFICE 2,333,956

YEAST PROPAGATION

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application June 13, 1940, Serial No. 340,316

11 Claims. (Cl. 195—82)

The invention relates to the propagation of yeast, and a suitable wort therefor. More particularly, it is concerned with a method for the production of a yeast suitable for baking, and to a synthetic wort in which the yeast may be grown, and includes correlated improvements and discoveries whereby the propagation of yeast may be enhanced.

An object of the present invention is the provision of a method whereby the growth of a yeast may be augmented and the yield increased.

A further object of the invention is to provide a method for the production of yeast in a synthetic wort or medium whereby increased yields of yeast having good color, baking and keeping qualities may be obtained.

Specific objects of the invention are the provision of a method in which propagation of a yeast is carried out in a medium containing a pyrimidine, either alone or in conjunction with a thiazole, and of a medium or wort, which may be largely synthetic, containing yeast assimilable carbohydrate material, a yeast assimilable inorganic salt and growth promoting substances.

Other objects of the invention will in part be obvious and will in part appear hereinafter.

The invention accordingly comprises the several steps and the relation of one or more of such steps with respect to each of the others, and the medium possessing the features, properties, and the relation of constituents, which are exemplified in the following detailed disclosure, and the scope of the invention will be indicated in the claims.

In the practice of the invention propagation or growth of a yeast, which may be a *Saccharomyces cerevisiae* type, may be effected in a medium or wort by adding to the medium such growth promoting factors as are required to establish therein conditions which facilitate utilization of the carbohydrate and nutrient materials and, in addition thereto, a pyrimidine per se or in conjunction with a thiazole. We have found that when such a yeast is thus propagated there may be obtained a full growth even though the medium or wort were largely or wholly synthetic. This has been shown especially with a yeast which has been designated by us as Fleischmann 189 yeast, and which may hereinafter be referred to briefly as 189.

The yeast is characterized further by being a *Saccharomyces cerevisiae* yeast of a distiller's type, of high baking strength, of high protein and invertase content, having good keeping qualities, and occasioning rapid fermentation of dextrose, sucrose and maltose. When this yeast is grown simply in a deficient cane-beet-molasses mixture, the utilization of wort materials and growth are not wholly satisfactory. However, if the medium or wort is supplemented by the addition thereto of certain growth promoting factors, which may be designated as I, believed to be inositol; $II_A$, believed to be beta alanine; and $II_B$, of unknown composition, the growth characteristics of the yeast are enhanced. These are further augmented when a pyrimidine, alone and in conjunction with a thiazole, are included in the wort. When these conditions pertain there is an obtainment of a high yield and an effective utilization of the wort materials.

A like effect may be shown with respect to the following yeasts, all of which are of the *Saccharomyces cerevisiae* type:

*Saccharomyces cerevisiae* Hansen strain, Delft I: Race XII: Delft II, and Nos. 2310, 2335 and 4109 of the American type culture collection.

Hence, a full growth of certain strains of yeast is brought about only when the growth promoting factors above mentioned are present in conjunction with a pyramidine and a thiazole.

The growth promoting factors may be obtained by preparing an alcohol extract, e. g. of malt sprouts, a molasses residue, or distillery slop, and treating this extract with baryta. The precipitate which is thus formed contains one of the factors, and the filtrate may be further fractioned by shaking with a charcoal. One of these remaining factors is not absorbed whereas another is. Hence, the group material may be separated into three factors, which may be utilized in the propagation of yeast.

As suggested above, it is indicated that the first factor is in all probability inositol, whereas the second is beta alanine. Isolation of a particular substance or substances constituting the third factor has not been accomplished. Further, the utilization of factor $II_A$, or beta alanine, may be attended by a partial substitution thereof by l-leucine and iso-leucine. We have found that beta alanine cannot be dispensed with entirely, but a part thereof may be replaced with a certain amount of leucine. Furthermore, it requires a larger quantity of leucine to produce one gram of yeast than if beta alanine is used. It may, however, be used in conjunction with and displace a part of beta alanine.

Factor $II_B$ may be produced by an extraction of cane distillery slop with butyl alcohol, methyl isobutyl ketone, or ethyl ether at a pH which is acid to Congo red. The preparation may also be brought about by concentrating molasses slop to 40° Balling and precipitating salts by the addition of alcohol in an amount of about 80%. The alcohol is then evaporated; the residue taken up with water, and an activated carbon introduced thereinto at a pH acid to Congo red. The activated carbon absorbs the factor IIb and this factor may be separated therefrom by elutriation with alcohol. Following distillation of the alcohol, the concentrated IIb residue may be extracted with ethyl ether or methyl isobutyl ketone and the IIb obtained therefrom by washing with water.

As a wort there may be employed a synthetic medium containing pure ingredients. Thus, pure carbohydrate, as cane sugar or dextrose; nutrient compounds as ammonium salts, factor I, or inositol; factor IIA, or beta alanine; and a pyrimidine alone or in conjunction with a thiazole. Preferably, an amino pyrimidine is utilized, and specifically 2-methyl-5-ethoxy methyl-6-amino pyrimidine, having the probable formula

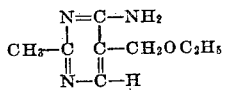

and as the thiazole 4-methyl-5-beta hydroxy ethyl thiazole having the probable formula

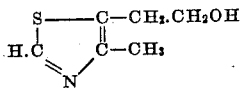

A wort containing the foregoing ingredients may be inoculated with the yeast, for example, about 20% of seed yeast, aeration initiated and propagation occasioned with continued aeration and preferably with a zulaufing of additional wort.

As an illustrative embodiment of a manner in which the invention may be practiced commercially, the following examples are presented:

Example I

A wort may be prepared in the proportions of a solution having a volume of 30 cc. and containing yeast nutrient and buffer salts in an amount of 0.928 gram, chemically pure dextrose 2.0 grams, and a yeast, moist weight, 0.001 gram. The nutrient salt mixture may contain one or more of the following compounds—potassium dihydrogen phosphate, potassium chloride, calcium chloride, magnesium sulfate, potassium citrate, citric acid, ferric chloride and manganese sulfate. This mixture is utilized as a control mixture, and when shaken for 24 hours at 30° C. the yeast content was about 0.004 gram. Mixtures of such compositions were seeded with yeast 189. To the mixtures there was then added growth promoting factors I (inositol), 0.001 gram; IIA (beta alanine) 0.00005 gram; and IIB, a solution containing 0.000328 gram.

With these mixtures there was also incorporated 10 gammas each of 2-methyl-5-ethoxy methyl-6-amino pyrimidine and 4-methyl-5-beta hydroxy ethyl thiazole. The results obtained were as follows:

| Addition materials | Crop |
| --- | --- |
| None | 40 |
| 10 gamma thiazole | 65 |
| 10 gamma pyrimidine | 80 |
| 10 gamma thiazole+10 gamma pyrimidine | 130 |

These results clearly show that the thiazole and pyrimidine have a growth promoting effect upon the yeast, and that they are more effective together than when either is used alone. One gamma equals 0.001 milligram.

Example II

The action of the pyrimidine and thiazole was also demonstrated with respect to vitamin B1 content by growing yeast 189 in a wort containing molasses seeded with about 20% of the yeast. Aeration of the wort is effected and carbohydrate and nutrient added in accordance with the zulaufing procedure. Propagation was effected at a temperature of about 30° C. with the following results:

| Addition materials | Yield 27% solids | Int. units B1 by gas | Total int. units B1 by gas |
| --- | --- | --- | --- |
| None | 81 | 6 | 500 |
| 3000 gamma pyrimidine | 82 | 13 | 1,087 |
| 3000 gamma thiazole | 81 | 6 | 500 |
| 3000 gamma pyrimidine+3000 gamma thiazole | 85 | 15 | 1,300 |

3 gamma are considered to be one International unit.

These results indicate that the pyrimidine is effective whereas the thiazole is not, and that when used alone in the growing of yeast there results a greater content of vitamin B1 than when yeast is grown in a wort to which only thiazole has been added.

There is accordingly thus provided a procedure whereby the growth characteristics of a yeast may be enhanced with an increase in yield and a substantially complete utilization of the energy and nutritive properties contained in the carbohydrate and salt constituents of the wort. Such result is accomplished by incorporating into a wort which is deficient in growth promoting factors, or into a synthetic carbohydrate salt wort, such growth promoting factors as are required to make up the deficiency and provide a balanced medium for yeast growth. The additional factors may be inositol, beta alanine, factor IIB, and a pyrimidine, more particularly a substituted pyrimidine, and especially 2-methyl-5-ethoxy methyl-6-amino pyrimidine, alone and in conjunction with a thiazole, as the 4-methyl-5-beta hydroxy ethyl thiazole.

It will thus be seen that the pyrimidine and thiazole are of marked advantage in the growing of a yeast, and that the invention therefore provides a ready means for controlling the growth of a yeast in various media, as spirit mashes, worts, doughs and the like, wherein more particularly there is a deficiency of growth promoting factors.

While a certain pyrimidine and thiazole are specifically mentioned in the foregoing examples, it will be realized that other pyrimidines and thiazoles capable of reacting under the influence of yeast to form thiamin may be incorporated into the medium, such as 2-methyl-4-amino-5-thioformyl amino-methyl pyrimidine, having the probable formula

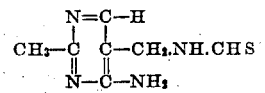

and pyrimidines containing, in the 5. position the methyl group and the group CH2X, this being a methyl group containing a substituent reactive group X which may be an ethoxy group, an amino group, and the like all being 5 substituted methyl pyrimidines characterized by having the group

at the 5 position. As a thiazole there may be employed the 4-methyl thiazoles containing, in position 5, a grouping of the character —CH₂.CH₂OH. Moreover, the thiazole may be formed in situ by reaction between suitable compounds, as thioformamide and chloroacetopropyl alcohol, or acetopropyl alcohol.

Since certain changes in carrying out the above process, and certain modifications in the wort which embody the invention may be made without departing from its scope, it is intended that all matter contained in the above description shall be interpreted as illustrative and not in a limiting sense.

This application is a continuation-in-part of our copending application Serial No. 141,858, filed May 10, 1937.

Having described our invention, what we claim as new and desire to secure by Letters Patent is:

1. A method for the production of yeast, which comprises propagating a *Saccharomyces cerevisiae* yeast under aeration, in a nutrient medium containing a yeast assimilable carbohydrate, a yeast nourishing inorganic salt, a methyl amino pyrimidine and a methyl thiazole whereby a full growth is obtained.

2. A method for the production of yeast, which comprises propagating a *Saccharomyces cerevisiae* yeast under aeration, in a nutrient medium containing a yeast assimilable carbohydrate, a yeast nourishing inorganic salt, a 5 substituted methyl pyrimidine and a methyl thiazole.

3. A method for the production of yeast, which comprises propagating a *Saccharomyces cerevisiae* yeast under aeration, in a nutrient medium containing a yeast assimilable carbohydrate, a yeast nourishing inorganic salt, 2-methyl-5-ethoxy methyl-6-amino pyrimidine and 4-methyl-5-B-hydroxy ethyl thiazole.

4. A method for the production of yeast, which comprises propagating a *Saccharomyces cerevisiae* yeast under aeration, in a nutrient medium containing a yeast assimilable carbohydrate, a yeast nourishing inorganic salt, growth promoting factors inositol, beta alanine, II$_B$, and a 5 substituted methyl pyrimidine.

5. A method for the production of yeast, which comprises propagating a *Saccharomyces cerevisiae* yeast under aeration, in a nutrient medium containing a yeast assimilable carbohydrate, a yeast nourishing inorganic salt, growth promoting factors inositol, beta alanine, II$_B$, a 5 substituted methyl pyrimidine and a methyl thiazole.

6. A method for the production of yeast, which comprises propagating a *Saccharomyces cerevisiae* yeast under aeration, in a nutrient medium containing a yeast assimilable carbohydrate, a yeast nourishing inorganic salt, growth promoting factors inositol, beta alanine, II$_B$, 2-methyl-5-ethoxy methyl-6-amino pyrimidine and 4-methyl-5-B-hydroxy ethyl thiazole.

7. A method for the production of *Saccharomyces cerevisiae* yeast, which comprises incorporating into a nutrient medium deficient in growth promoting factors a methyl amino pyrimidine and a methyl thiazole whereby a full growth is obtained.

8. A method for the production of *Saccharomyces cerevisiae* yeast, which comprises incorporating into a nutrient medium deficient in growth promoting factors a 5 substituted methyl pyrimidine and a methyl thiazole.

9. A method for the production of *Saccharomyces cerevisiae* yeast, which comprises incorporating into a nutrient medium deficient in growth promoting factors 2-methyl-5-ethoxy methyl-6-amino pyrimidine and 4-methyl-5-B-hydroxy ethyl thiazole.

10. A nutrient medium for the production of a *Saccharomyces cerevisiae* yeast containing yeast assimilable carbohydrate material, a yeast nourishing salt, a 5 substituted methyl pyrimidine and a methyl thiazole.

11. A nutrient medium for the production of a *Saccharomyces cerevisiae* yeast containing yeast assimilable carbohydrate, a yeast nourishing salt, 2-methyl-5-ethoxy methyl-6-amino pyrimidine and 4-methyl-5-B-hydroxy ethyl thiazole.

ALFRED S. SCHULTZ.
LAWRENCE ATKIN.
CHARLES N. FREY.